(12) United States Patent
Nelson

(10) Patent No.: US 7,085,490 B1
(45) Date of Patent: Aug. 1, 2006

(54) DENSITY RANGE CONTROL IN A PHOTOGRAPH BY VARIATION OF HUE DENSITY RANGE OF THE NEGATIVE

(76) Inventor: Mark Nelson, 240 S. Aldine, Elgin, IL (US) 60123

( * ) Notice: Subject to any disclaimer, the term of this patent is extended or adjusted under 35 U.S.C. 154(b) by 147 days.

(21) Appl. No.: 10/846,194

(22) Filed: May 14, 2004

(51) Int. Cl.
G03B 33/00 (2006.01)
G06K 15/12 (2006.01)

(52) U.S. Cl. .................. 396/305; 348/96; 358/2.1; 358/302; 358/518

(58) Field of Classification Search ............. 355/520; 396/305; 348/96, 97; 358/2.1, 3.02, 302, 358/518
See application file for complete search history.

(56) References Cited

U.S. PATENT DOCUMENTS

| | | | |
|---|---|---|---|
| 4,159,174 A | 6/1979 | Rising | |
| 4,504,141 A * | 3/1985 | Yamakoshi | 355/77 |
| 5,051,341 A | 9/1991 | Muenter et al. | |
| 5,231,506 A * | 7/1993 | Manico et al. | 358/302 |
| 5,329,383 A * | 7/1994 | Collette | 358/500 |
| 5,473,446 A | 12/1995 | Perumal, Jr. et al. | |
| 5,499,044 A * | 3/1996 | Collette | 347/232 |
| 5,657,137 A | 8/1997 | Rerumal, Jr. et al. | |
| 5,917,987 A * | 6/1999 | Neyman | 386/42 |
| 6,221,569 B1 | 4/2001 | Ishikawa | |
| 6,554,504 B1 | 4/2003 | Cook et al. | |
| 6,594,388 B1 | 7/2003 | Gindele et al. | |
| 6,603,878 B1 | 8/2003 | Takemoto | |
| 6,714,314 B1 | 3/2004 | Ueda | |
| 2003/0095802 A1 | 5/2003 | Mimaki et al. | |
| 2003/0133717 A1 | 7/2003 | Gregoris | |

OTHER PUBLICATIONS

Lyons, Ian. "Black & White from Colour." Nov. 2001. (http://homepage.mac.com/ilyons/pdf/tutorial2-6.PDF); p. 1-8.*

* cited by examiner

Primary Examiner—W. B. Perkey
Assistant Examiner—Rishi Suthar
(74) Attorney, Agent, or Firm—Matthew R. P. Perrone, Jr.

(57) ABSTRACT

A negative density range control system uses color hue contrast to provide a print of a picture, by comparing the relationship between negative hue density and print emulsion density requirement and providing an appropriate density for a printing process, whether converting a positive digital image to negative digital image with a specific hue density color or making a print by contact printing a hue density negative rendered from a digital image file.

19 Claims, 5 Drawing Sheets

Figure 2
Light Source → 202
Hue Density Range Step Tablet → 204
  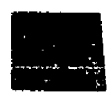
*Hue #1*   *Hue #2*   *Hue #3*
  
*Hue #4*   *Hue #5*   Hue #6
*Hue Density Step Tablet*
Test Print → 206
Hue #1   Hue #2   Hue #3
 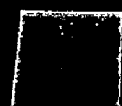 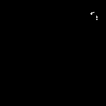
Hue #4   Hue #5   Hue #6
*Hue Density Step Tablet*

Optimum RGB Values
For Hue Density Range Control
500

DENSITY RANGE CONTROL IN A PHOTOGRAPH BY VARIATION OF HUE DENSITY RANGE OF THE NEGATIVE

This invention relates generally to negative contrast control by hue variation and more particularly, to negative contrast control system by hue variation of a density range for contact printing photographic images and the use of hue variation of direct exposure, in order to render a positive image on monochromatic papers and printing plates.

BACKGROUND OF THE INVENTION

For the period of the nineteenth century, with photography beginning to come on the scene, all photographic images are printed by contact printing. Cameras for that time make "negatives" on coated glass plates or paper. This negative is then placed on top of a paper coated with a light-sensitive emulsion and Contact Printed using sunlight. The resulting positive print will be the exact size of the original negative.

During the early years of photographic history, the only light source available for contact printing is the sun. Since the sun is such an intense light source, use of such a high intensity light requires these early processes to be slow reacting or take a relatively long exposure time to render a positive image with a full tonal scale. There are literally hundreds of different processes invented for hand coating papers that meet these requirements.

Just a few processes for this purpose are: Platinotype (using Platinum), Palladiotype (using Palladium metal to render image), Kallitype, Gum Bichromate, Salt Prints, Cyanotype, and the like. These processes produce very beautiful prints that, for the most part, were of a single color or monochromatic. Most people are familiar with the sepia tone of the old platinum/palladium prints or the bright blue color of the Cyanotype print.

Toward the end of the 19th century and during the first part of the 20th century, some companies even produce machine coated paper that can be purchased and used for a few of these processes. Platinum paper, for example, is available for many years, until wartime shortages occur. The heavy demand for platinum by the arms industry, during World War I for example, causes a dramatic rise in the cost of platinum and makes the process too expensive for the average commercial photographer.

Since these old processes vary greatly in their sensitivity to light, especially light in the ultraviolet range of the spectrum, photographers shorten or lengthen their camera exposures to get a less dense or more dense negative that will in turn do a contact print properly with a given process. This provides their method of contrast control. In addition, methods of altering the chemistry of the paper coatings are discovered which also allow for contrast control, so that the process can be adjusted to the density of the negative.

For the early 20th Century, machine made gelatin silver paper (commonly known as the black and white print) is readily available. Later, gelatin silver paper is used, because it can be developed and printed much faster. In this fashion, this paper may be printed by projecting a small negative onto a large piece of gelatin silver paper with an electric light and some lenses. Such structure provides the darkroom enlarger.

Commercial gelatin silver printing replaces all the old processes because it is cheaper and faster. Gelatin silver printing is preferred, since it can be printed with an enlarger and has the added benefit that smaller cameras with smaller negatives can be used.

The computer age provides the digital camera and the scanner, which cooperate with a computer run by photo processing software. Such software is available under the trademark Photoshop. Such software is used to further refine the digital image file and then print it with an inkjet printer on various papers or send the file to a custom lab with a high end laser or LED imaging device to be imaged on color photographic paper.

The old photographic processes regain popularity, because of their beauty and archival quality. Platinum prints are thought to last 1,000 years without fading. There is a resurgence of interest in using many of the old processes, primarily in the field of fine art photography.

With the advent of the computer and digital imaging, the possibility arises for making enlarged negatives with inkjet printers, image setters, and laser or LED imaging devices-negatives that can be contact printed with all the old processes; and even the modern black and white, gelatin silver papers. To print a negative with an inkjet printer, the inverted image is printed on clear film instead of paper. This negative can then be contact printed on paper sensitized with one of the old process's chemicals.

The problem with current digital negatives revolves around printing a negative properly. In order for a negative to print properly, the density range of the negative must match the density range requirements of the process chemicals used to coat the paper to make the final print. For example, the Gum Bichromate process requires a negative of a shorter density range (Log 0 to log 1.0) than Platinum/Palladium printing (Log 0 to log 1.2 or log 2.5).

There are few ways to adjust this density other than some printer settings and even that is not very accurate and rarely provides the desired density range. So, common practice is to use what is called a Curve Function in Photoshop or another image editing program to change all the image densities to match the density requirements of the process.

The problem with adjusting the density range of the image this way with the Curve Function is that the alteration is so drastic that it compresses and stretches the image densities-resulting in the loss of many of the tonal values in the image. So the final print does not show the rich, full range tonal range that one gets with a traditional in camera negative.

SUMMARY OF THE INVENTION

Among the many objectives of this invention is the provision of a negative density range control system by hue variation for contact printing photographic images.

A further objective of this invention is the provision of a negative density range control system using a color chart to determine the proper hue.

Yet a further objective of this invention is the provision of a negative density range control system to print pictures.

A still further objective of this invention is the provision of a negative density range control system, based on different color hues.

Yet another objective of this invention is the provision of a negative density range control system.

These and other objectives of the invention (which other objectives become clear by consideration of the specification, claims and drawings as a whole) are met by providing a negative density range control system, using color hue density control to provide prints of images.

BRIEF DESCRIPTION OF THE DRAWINGS

FIG. 2 depicts a hue density table 200, adapted to provide an appropriate density for a printing process.

Throughout the figures of the drawings, where the same part appears in more than one figure of the drawings, the same number is applied thereto.

DESCRIPTION OF THE PREFERRED EMBODIMENTS

Figure 1:
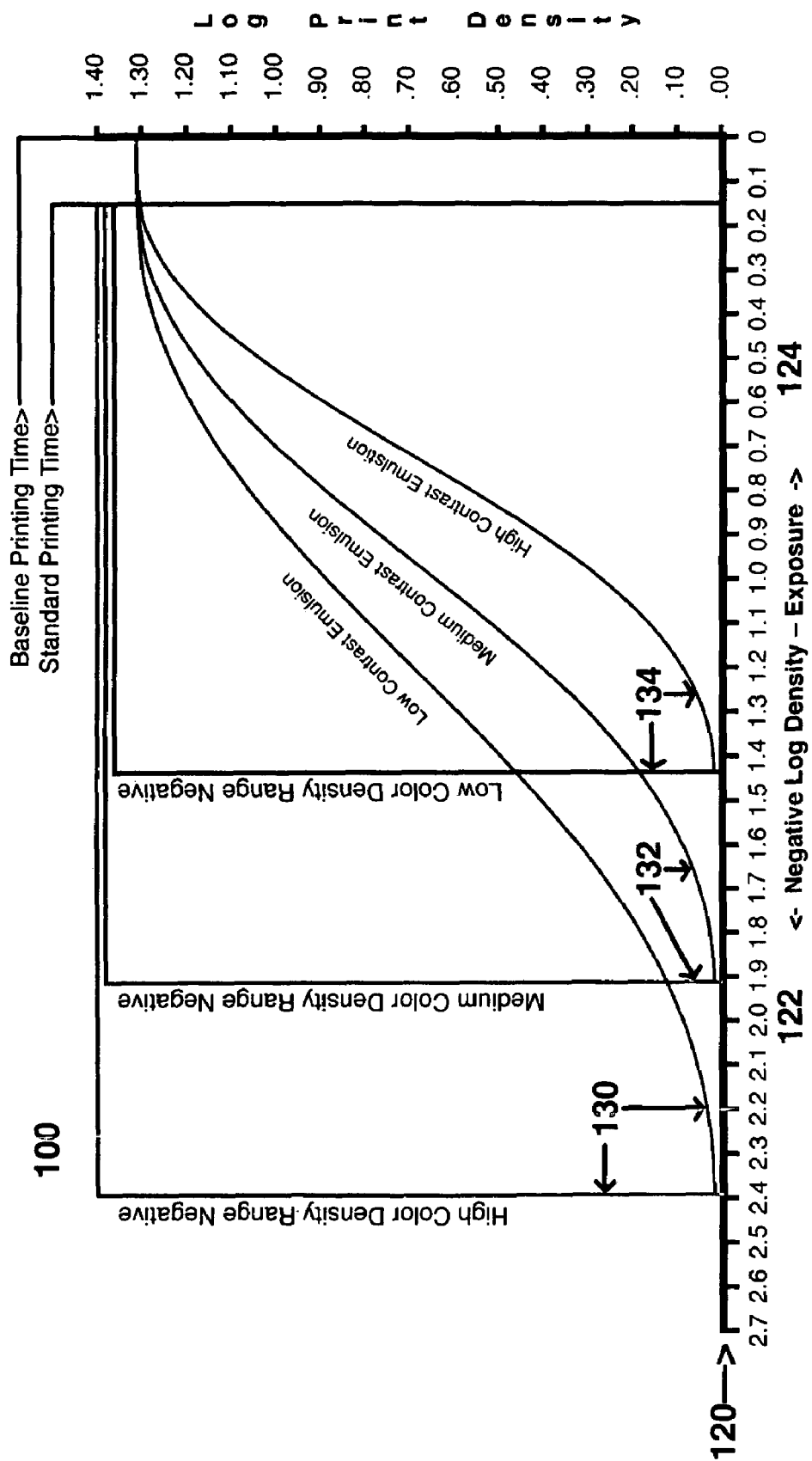
FIG. 1 depicts a relationship chart 100 depicting the relationship between negative hue density range and print density and the improvement therein brought about by the method of this invention.

To achieve negative density range control by hue variation for contact printing photographic images, and the use of hue variation in the control of density range of direct exposure, in order to render a positive image on monochromatic papers and printing plates creates a greatly improved process for providing negatives or pictures. By hue is meant the color of the negative in contact printing or the color of light in direct exposure of positives. Color and hue may be used interchangeably herein.

The solution for better digital negatives controls negative density ranges. The method of controlling digital negative density ranges of this invention works with any of the 19th century processes and any modern processes that can be exposed by a Contact Printed Negative.

Instead of using the Curve Function to adjust the density range of the image negative, a far better negative can be made by converting the black and white negative image to a hue or color that prints with the density range required by the process. This method is more predictable, accurate and most important of all, preserves all the tonality of the original image. It works with any device that can make negatives, such as inkjet printers or high end imaging devices that use lasers or a light emitting diode (hereafter sometimes called LED) to print the inverted image on various color films.

Thus, the density range of a negative can be targeted very accurately across a wide range by converting the black and white tones to levels of saturation of a specific hue of the color spectrum. This is done in a program such as Photoshop or any image editing program by converting the grayscale image to RGB color values such as Red=25, Green=255, Blue=0. By RGB is meant (Red-Green-Blue) format. This creates a negative that appears bright green with a slight yellow cast. The tonal densities of the original black and white negative are thus converted corresponding levels of saturation of the hue; wherein RGB values have red equal 25, green equal 255 and blue equal zero.

This type of hue or color conversion can be done with any grayscale or monochromatic image. The actual density range achieved by the example RGB values will depend on the device used to print the negative and the substrate or film it is printed on. However, it is very simple to use a step tablet made up of graduated hues or color values, print it on the chosen device, and build a profile of the densities of color hues for that device, when used with the specific printing process such as platinum or Cyanotype as above listed. Once this is done, negatives of a desired density range can be fabricated in a very predictable manner.

This method works for processes sensitive to any spectrum of light, including ultraviolet light and the visible light spectrum. Though it utilizes color hues, it is for rendering monochromatic prints and thus it is different in use from the various full color processes that everyone is familiar with today.

Density range control by hue (color) modification of digital image files for the fabrication of negatives for contact printing on light sensitive emulsions and papers renders higher quality prints. This is a process for making a negative on a transparent or translucent material from a digital image or graphics file. The negative will be used for contact printing on sensitized paper or any other substrate that is coated with a light-sensitive emulsion or dispersion.

By converting a grayscale or black and white digital image to a color file (RGB), and then adjusting the color hue of the image file, the resulting density range of the color negative will be adjusted optimally to match the exposure range requirements of the light-sensitive material on which the final image will be rendered by contact printing. The material upon which the final image is rendered can easily be tested to determine the optimum color hue to be used.

The closest method or application is believed to be a method commonly used in gelatin silver printing where filters of varying densities of cyan, magenta and yellow are used singly or in combination when printing with polycontrast or multi-grade gelatin silver papers (black and white) specific filter packs. These filters are referred to as poly-contrast filters, dichroic filters, or multi-grade filters.

Poly contrast filters are normally used only with black and white negatives that are projected on the paper with an enlarger, though one can contact print a large format black and white negative on this paper under the enlarger light and adjust the filters. However, this process, of using polycontrast filters, and traditional black and white film negatives, differs from the method described in this application.

This method has many practical applications. In one case, the use of the method provides a multi-hue step tablet to determine the exact hue necessary to produce a negative for any light sensitive emulsion of unknown density range requirement, known contrast or density range requirement, or variable contrast or density range requirement. By contact printing the multi-hue step tablet on the given light-sensitive emulsion and determining the hue that just barely renders paper white, were no printed density, the proper hue of a negative for that process is determined.

A second use of the method is to fabricate negatives of a specific hue which has the appropriate contrast or density range to work most efficiently when contact printing the resulting negative with any light sensitive emulsion.

A third use of the method is to contact print a negative of the appropriate hue on any light sensitive emulsion.

A fourth use of the method is in the same manner with imaging devices such as lasers, or light emitting diodes (LED's) to control the hue of the light emitted when exposing light-sensitive emulsions. This method is not to be confused with the method of using various hues of light from such devices in order to expose Color Photographic Emulsions to render full color images.

A fifth use of the method is used to design a specialized color negative sheet film with a clear base (current color negative films all have an orange base or mask that will interfere with the ability to get pure hues in the negative) that will be exposed in a medium to large format camera (since the negative has to be the size of the final print when contact printing) with color filters of various hues over the lens, thus creating negatives which will have the appropriate hue or densities to match any of the printing processes. The method might also work with "chrome" films or color positive films that are currently available today-however this type of camera "negative" will only work with those processes such as photogravure, which require a positive of the image for contact printing.

A sixth use of the method is used with laser or LED imaging devices on papers coated with gelatin silver emulsions or other monochromatic emulsions to make prints directly from digital files without having to make negatives for contact printing.

A seventh use of the method is used to expose plates for photogravure, a process of making a plate that is used in an etching press to reproduce multiple copies of a photographic image with ink on fine etching papers. In this case, the negative is actually a positive image on the film that is used for contact printing the plate material. With the modern photosensitive polymer plates, this method will have a very distinct advantage in that polymer plates are sensitive to the ultraviolet spectrum and must be contact printed with an ultraviolet light source. Polymer plates come in "one speed", so there is currently no method of density range control. A "negative" fabricated with the appropriate hue matches the sensitivity range of the plate emulsion, and thus will have a distinct advantage and render more tonality than is currently possible. This method can also be used for more precise control of exposure of any sensitized printing plate.

In FIG. 1 is depicted a relationship chart 100 in graph form. The horizontal axis 120 provides a relationship of a negative log density 122 with exposure 124. Relationship chart 100 depicts the effect of high color density range negative 130, medium color density range negative 132, and low color density range negative 134.

FIG. 2 depicts a hue density tablet 200, adapted to determine an appropriate density for a printing process. A light source 202 shines on a hue density table 204 and produces a test print 206. Thus, the appropriate hue density is obtained.

Figure 3:
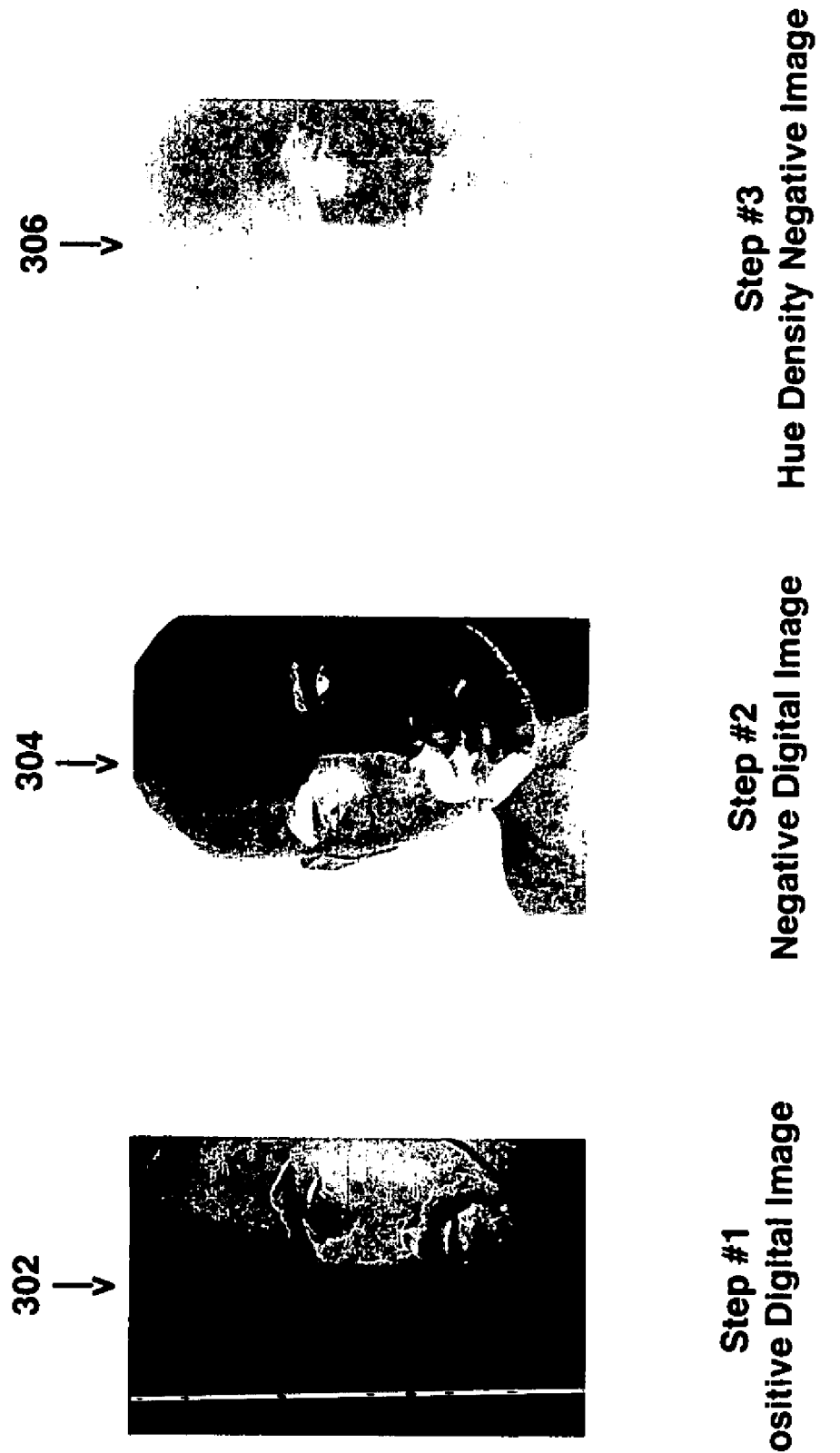
FIG. 3 depicts a conversion table 300 for converting a positive digital image to negative digital image with a specific hue density color.

FIG. 3 depicts a conversion table 300 for producing a hue density negative image 302. This process starts with a positive digital image 304 and then converts image 304 to a negative digital image 306. From the negative digital image 306 comes hue density negative image 302.

Figure 4:
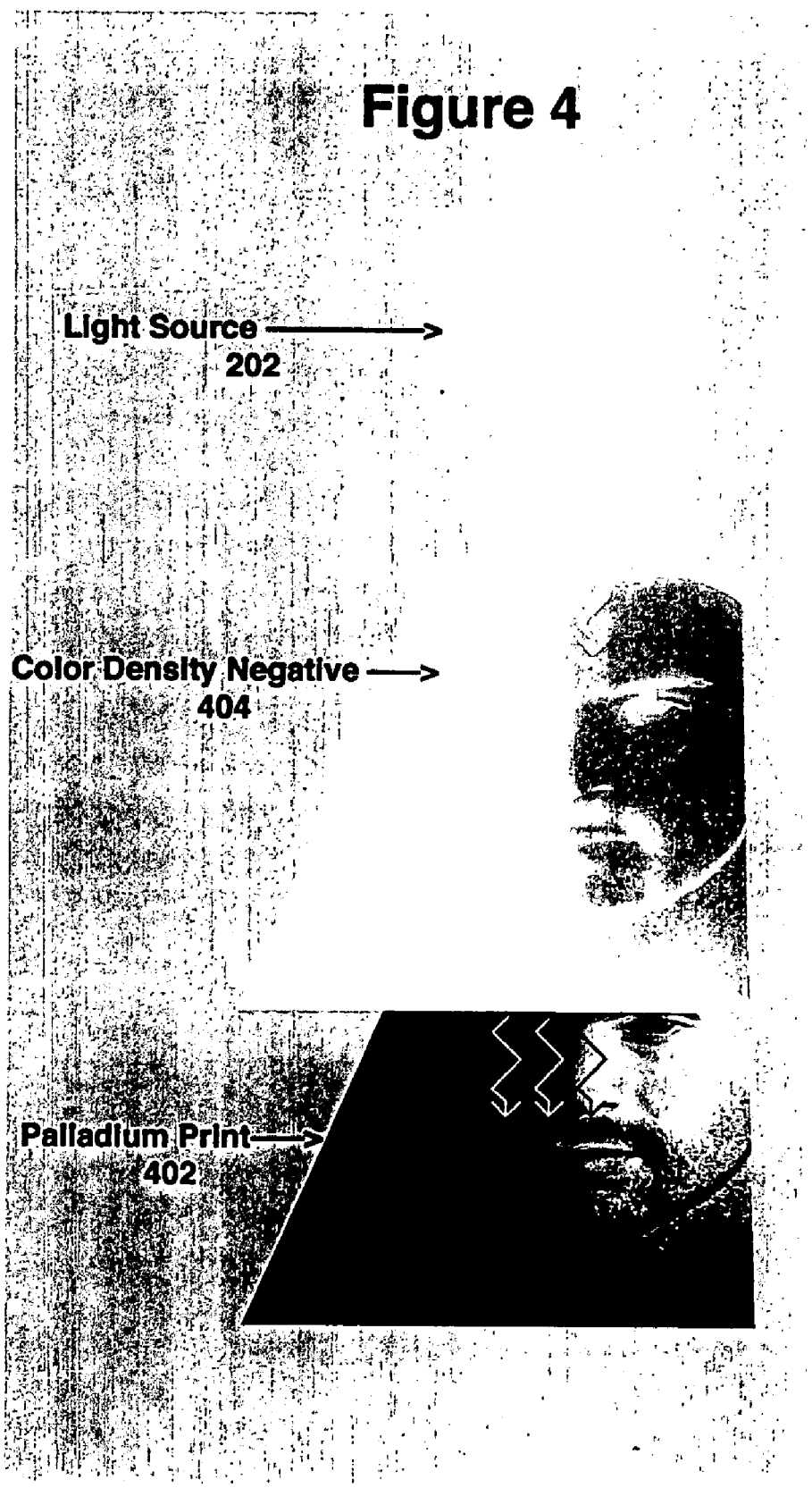
FIG. 4 depicts a generation table 400, for a print by contact printing a hue density negative rendered from a digital image file.

FIG. 4 depicts a generation table 400, for a palladium print 402 by contact printing a color or hue density negative 404 rendered from a digital image file or a light source 202.

Figure 5:
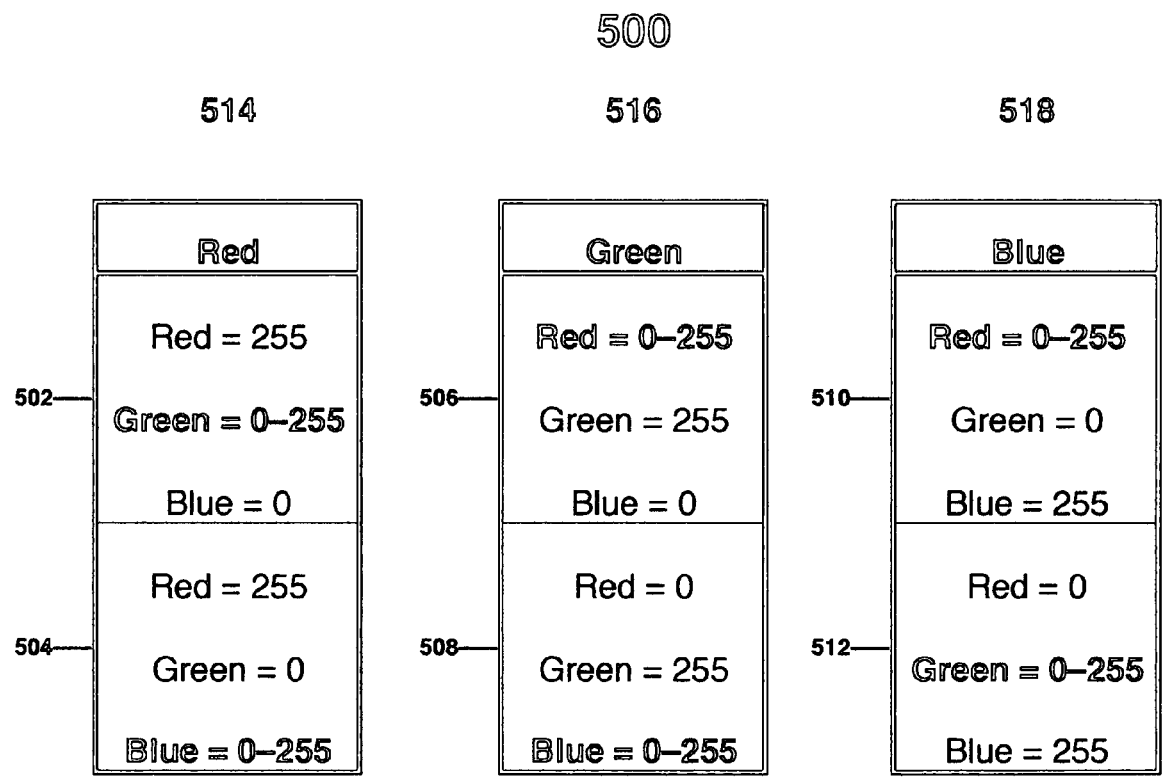
FIG. 5 depicts a hue chart 500 showing a variety of ways to obtain 256 colors.

FIG. 5 depicts a hue chart 500 showing a variety of ways to obtain 256 colors in the Red Green Blue color scheme. In first square 502, red has a value of 255 while green has a value of zero to 255 and blue is zero. In second square 504, red has a value of 255 while green is zero and blue has a value of zero to 255. These numbers complete red group 514.

In third square 506, red has a value of zero to 255 while green has a value of 255 and blue is zero. In fourth square 508, red has a value of zero while green is 255 and blue has a value of zero to 255. These numbers complete green group 516.

In fifth square 510, red has a value of zero to 255 while green has a value of zero and blue is 255. In sixth square 512, red has a value of zero while green is zero to 255 and blue has a value of 255. These numbers complete blue group 518.

This application; taken as a whole with the abstract, specification, claims, and drawings being combined; provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A process for producing photographic negatives for making monochromatic photographs from a monochromatic computer image comprising:
   (a) providing a monochromatic computer formatted image;
   (b) providing a computer software program capable of converting image files to a color image with a color value system of colors;
   (c) providing a printing device capable of printing a computer formatted image;
   (d) using the computer software program to convert the monochromatic computer formatted image into a color image;
   (e) assigning to the color image a formatted image with an appropriate set of values from the color value system;
   (f) printing the color image using the printing device on a sheet of film paper; and
   (g) the film paper printed by the printing device being the negative produced.

2. The process of claim 1 further comprising:
   (a) changing the monochromatic computer formatted image into a grayscale image;
   (b) converting the grayscale image to the color image with an appropriate set of values from the color value system; and
   (c) adjusting the appropriate set of values for the color image being determined by adjusting the hue of the color image so that the printing device prints the negative with a resulting density range optimally matching the exposure range required of a light-sensitive material on which a final image will be rendered by contact printing.

3. The process of claim 2 further comprising:
   (a) providing a step tablet having a set of graduated color values;
   (b) printing the step tablet with the light-sensitive material;
   (c) building a profile of the densities of color for the light-sensitive material so that the resulting density range optimally which matches the exposure required of the light-sensitive material can be determined in order to print negatives in a very predictable manner;
   (d) determining the resulting density range; and
   (e) printing negatives adjusted to the resulting density range.

4. The process of claim 3 further comprising:
   (a) converting the grayscale image to a digital negative of the grayscale image;
   (b) determining an adjusting hue of the profile by determining the hue from the profile that just barely renders the light-sensitive material white;

(c) selecting an adjusting color value from the color value system that corresponds to the adjusting hue; and (d) adjusting the digital negative of the grayscale image with the computer software program to a hue of the adjusting color value thereby producing the color image so that the printing device prints the negative with a resulting density range optimally matching the exposure range required of a light-sensitive material on which a final image will be rendered by contact printing.

5. The process of claim 4 further comprising:

(a) selecting the printing device for the negative from the group consisting of an inkjet printer, a laser device or a light emitting diode device;

(b) targeting a density range of the negative; and (c) converting a set of black and white tones for the negative to the color system.

6. The process of claim 5 further comprising:

(a) using light source in the ultraviolet light or the visible light range; and (b) using the multi-hue step tablet to determine the resulting density range optimally matching the exposure required of the light-sensitive material to print the negative.

7. The process of claim 6 further comprising providing at least one negative for contact printing on the light-sensitive material being either a light-sensitive emulsion or a light sensitive paper in order to provide a good picture.

8. The process of claim 7 further comprising providing making the at least one negative on a transparent material or translucent material from a digital image or graphics file.

9. The process of claim 7 further comprising providing contact printing the at least one negative on a light-sensitive material coated with a light-sensitive emulsion or dispersion.

10. The process of claim 7 further comprising:

(a) controlling light from an imaging devices; and (b) controlling a color of light emitted when exposing light-sensitive material.

11. The process of claim 10 further comprising:

(a) providing a color negative sheet film with a clear base;

(b) exposing in a medium to a large format camera with color filters of various hues over the lens;

(c) creating negatives with the resulting density range to match a printing process.

12. The process of claim 11 further comprising:

(a) selecting the adjusting color value with a color value system of 256 values in a color system and the color system including red, blue and green; wherein a red group with a first square wherein red has a value of 255 while green has a value of zero to 255 and blue is zero;

(b) providing the red group for the adjusting color value wherein red has a value of 255 while green has a zero and blue has a value of zero to 255; and (c) completing the red group.

13. The process of claim 11 further comprising:

(a) selecting the adjusting color value with a color value system of 256 values per color system and the color system including red, blue and green wherein a green group in the color system has a third square wherein red has a value of zero to 255 while green has a value of 255 and blue is zero (b) providing the green group for adjusting a color value with a fourth square wherein has a value of zero while green has a value of 255 and blue has a value of zero to 255; and (c) completing the green group.

14. The process of claim 11 further comprising:

(a) providing a blue group with a fifth square wherein red has a value of zero to 255 while green has a value of zero and blue has a value of 255;

(b) providing the blue group for the adjusting color value with a sixth square wherein red has value of zero while green has a value of zero to 255 and blue has a value of 255; and (c) completing the blue group.

15. A system for negative density range control by hue variation of imaging negatives for contact printing photographic images comprising:

(a) a computer software program;

(b) a printing device;

(c) a negative paper;

(d) the computer software program being capable of converting a monochromatic image file into a color image file;

(e) the computer software program being capable of assigning a set of color values to set a hue for the color file;

(f) the computer software program being capable of communicating with the printing device to print the color file in a red green blue color scheme; and (g) the printing device being capable of printing the color file onto a paper suitable for use as a negative.

16. The system of claim 15 wherein the color system is an RGB system based on a red green and blue system.

17. The system of claim 16 wherein the RGB system further comprises:

(a) an adjusting color value for assigning a set of color values to set a hue for the color file;

(b) a color value system for the RGB system having 256 values per color system; and (c) a red group for the adjusting color value wherein red has a value of 255 while one of the other colors has a value of zero and the remaining color has a value of zero to 255.

18. The system of claim 16 wherein the RGB system further comprises:

(a) an adjusting color value for assigning a set of color values to set a hue for the color file;

(b) a color value system for the RGB system having 256 values per color; and (c) a green group for the adjusting color value wherein green has a value of 255 while one of the other colors has a value of zero and the remaining color has a value of zero to 255.

19. The system of claim 16 wherein the RGB system further comprises:

(a) an adjusting color value for assigning a set of color values to set a hue for the color file;

(b) a color value system for the RGB system having 256 values per color; and (c) a blue group for the adjusting color value wherein blue has a value of 255 while one of the other colors has a value of zero and the remaining color has a value of zero to 255.

* * * * *